April 15, 1958 H. C. WINKEL 2,830,692
ASSEMBLING MACHINE FOR BATTERY PLATE GROUPS
Filed Sept. 14, 1953 8 Sheets-Sheet 1

INVENTOR.
HERBERT C. WINKEL
BY
ATTORNEY

April 15, 1958     H. C. WINKEL     2,830,692
ASSEMBLING MACHINE FOR BATTERY PLATE GROUPS
Filed Sept. 14, 1953     8 Sheets-Sheet 2
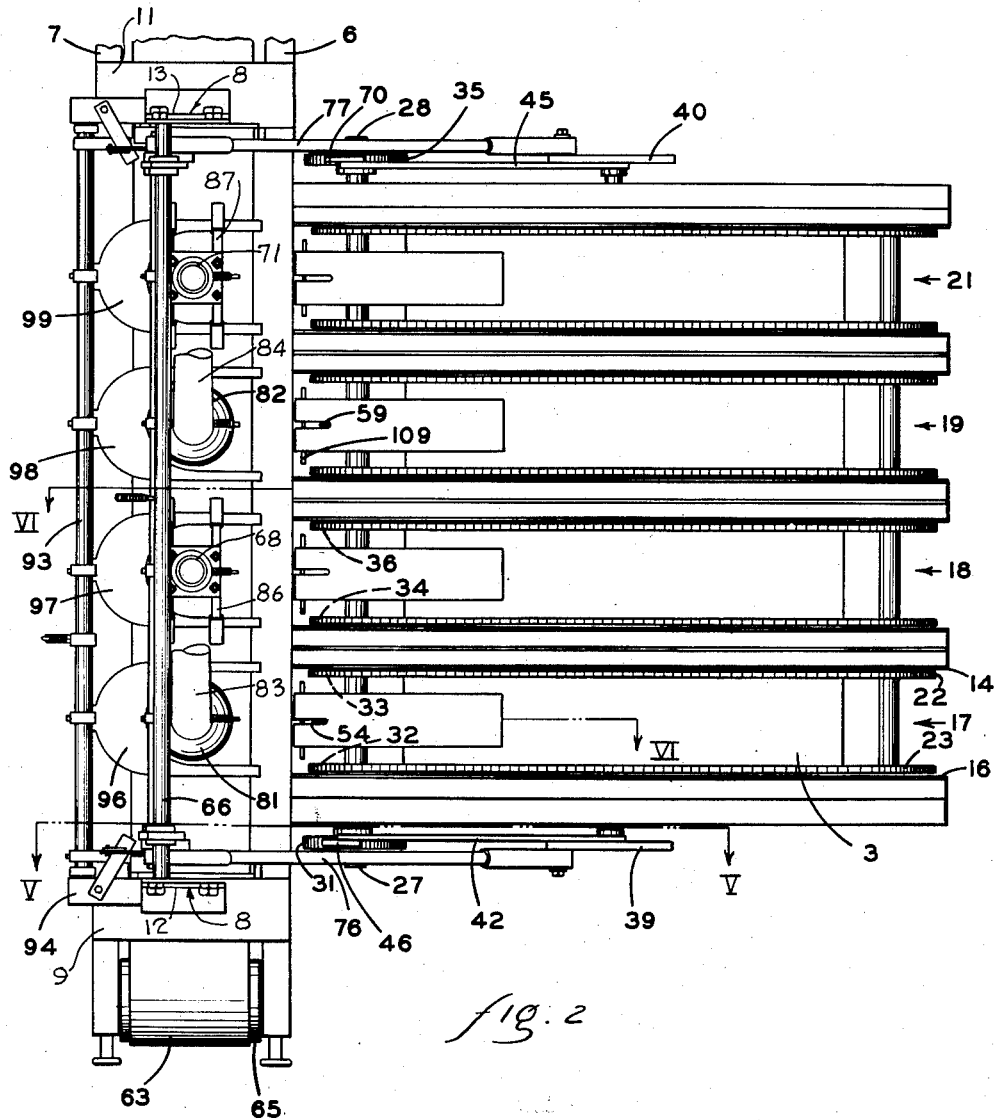
fig. 2
INVENTOR.
HERBERT C. WINKEL
BY
ATTORNEY

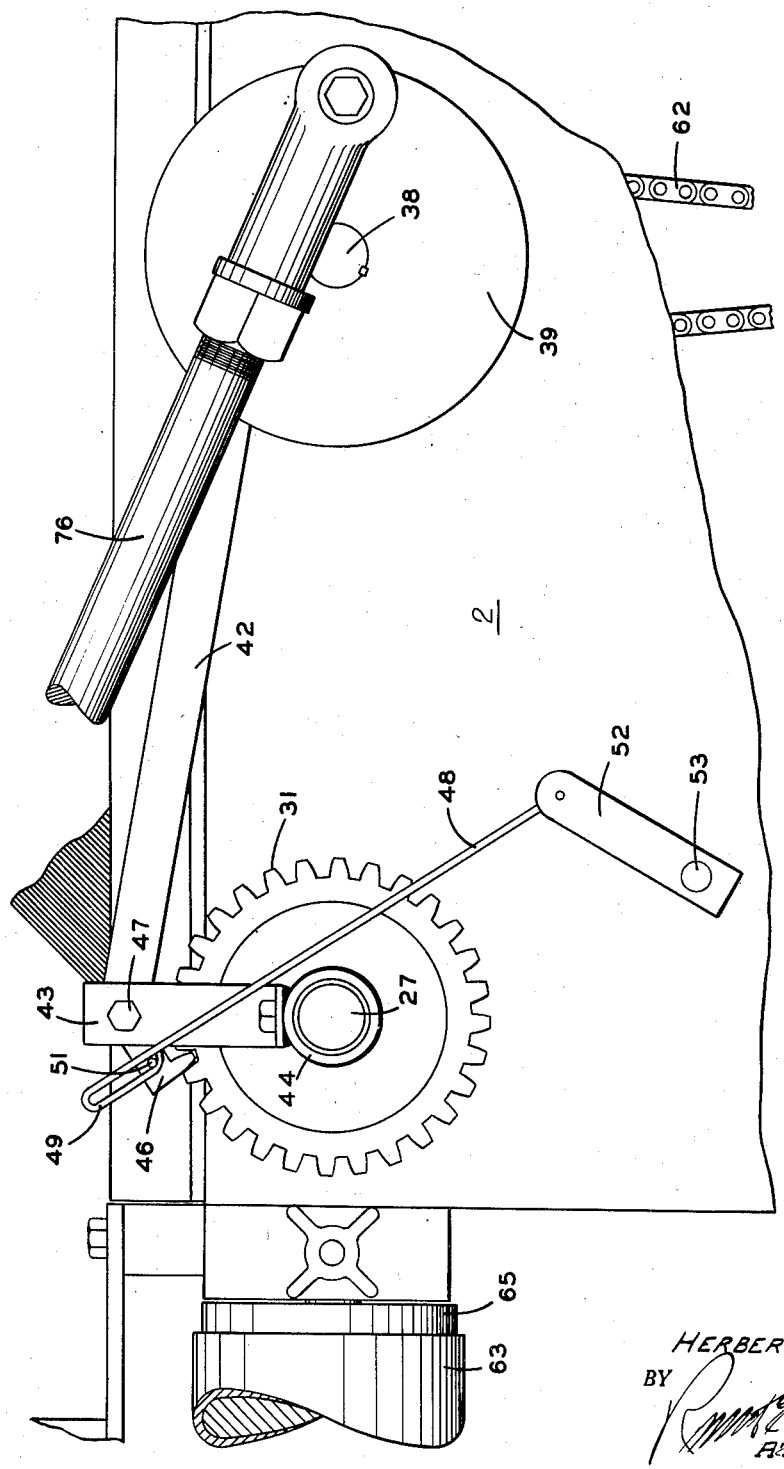

April 15, 1958     H. C. WINKEL     2,830,692
ASSEMBLING MACHINE FOR BATTERY PLATE GROUPS
Filed Sept. 14, 1953     8 Sheets-Sheet 5
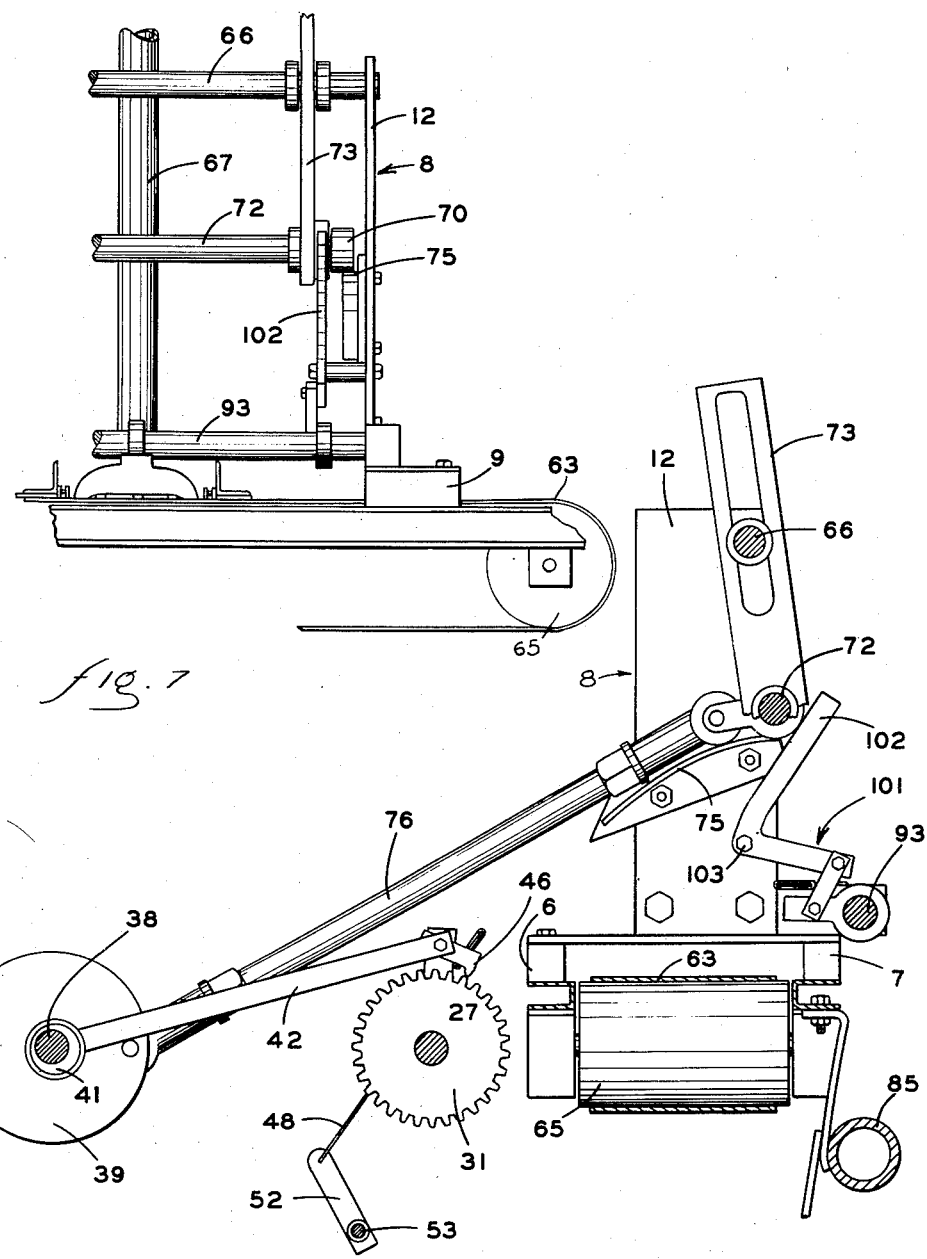
INVENTOR.
HERBERT C. WINKEL

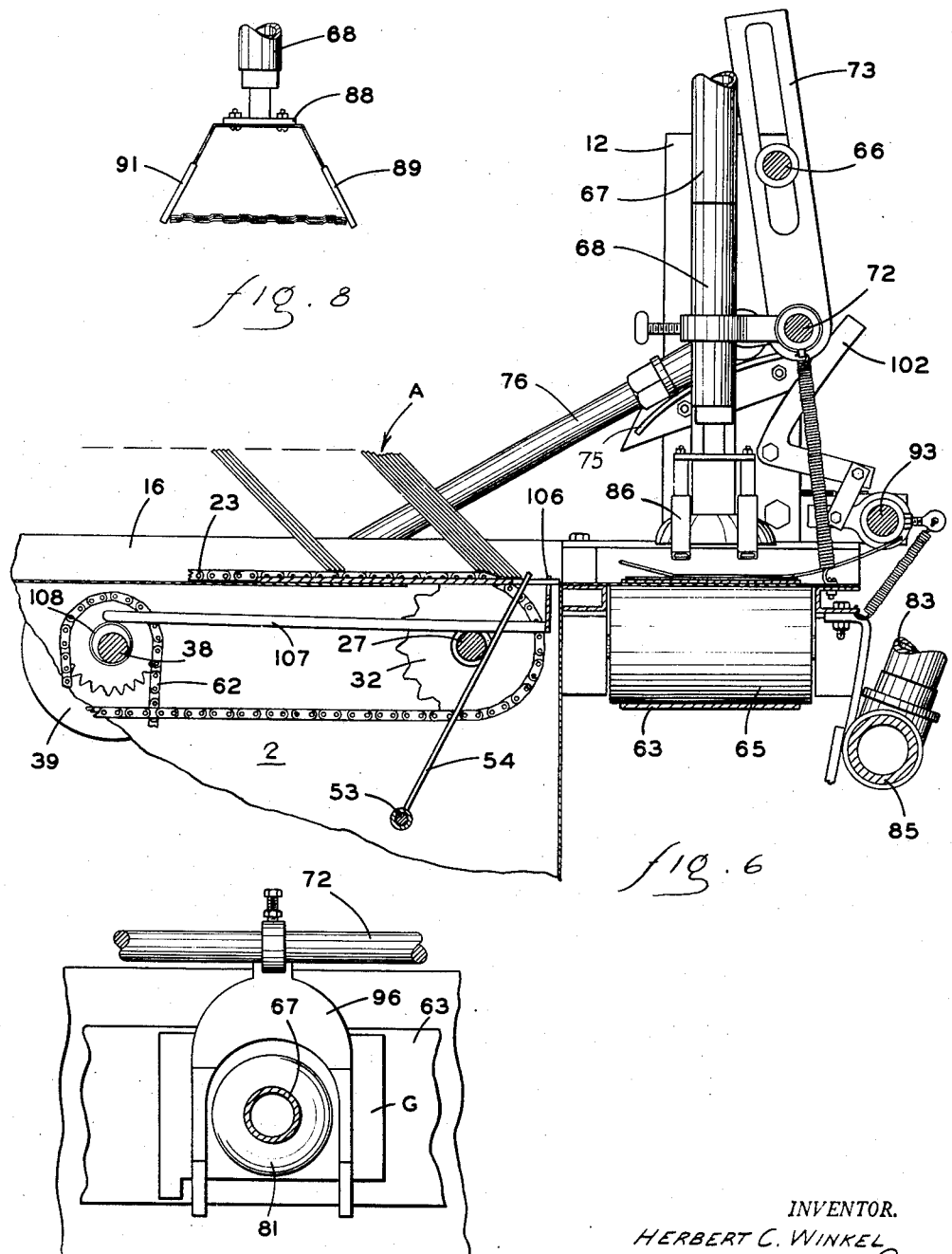

April 15, 1958 H. C. WINKEL 2,830,692
ASSEMBLING MACHINE FOR BATTERY PLATE GROUPS
Filed Sept. 14, 1953 8 Sheets-Sheet 8
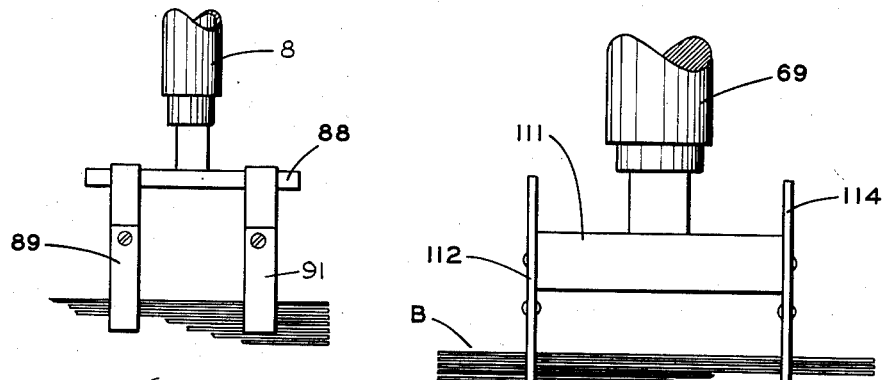
fig. 11
fig. 13
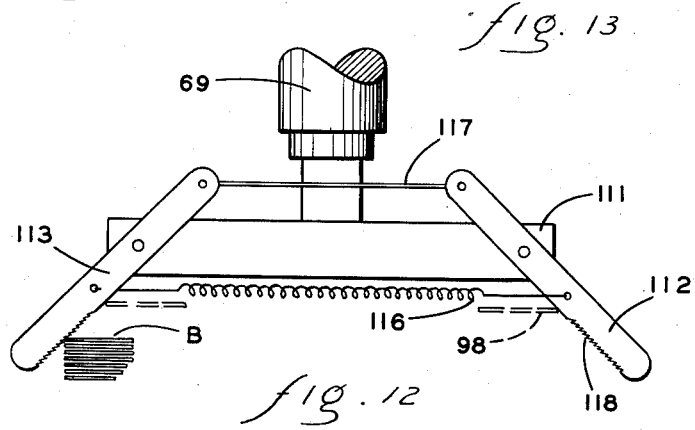
fig. 12
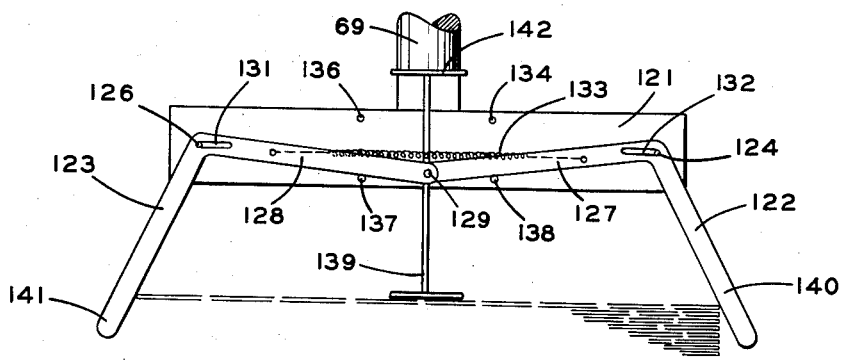
fig. 14
INVENTOR.
HERBERT C. WINKEL
BY
ATTORNEY

United States Patent Office 2,830,692
Patented Apr. 15, 1958

2,830,692

ASSEMBLING MACHINE FOR BATTERY PLATE GROUPS

Herbert C. Winkel, Watervliet, Mich.

Application September 14, 1953, Serial No. 380,006

4 Claims. (Cl. 198—35)

This invention relates to an assembling machine for battery plate groups and particularly to a type thereof by which the component parts of a battery plate group are placed upon parallel, horizontal conveyors and are automatically lifted therefrom and assembled on a further horizontally moving conveyor into a battery plate group.

In the assembling of battery plate groups, it has been conventional to carry out this operation as a hand process. The workman will normally have in front of him on a table a stack of negative grids suitably filled with paste and a stack of positive grids likewise suitably filled with paste and one or two stacks of dividers. He then manually selects grids and dividers from said stacks and assembles them in a predetermined order into a unit group for subsequent assembly with other similar unit groups to form a final group of plates and dividers suitable for use in a storage battery.

Although the manual assembling of such parts is reasonably rapid and usually accurate, it requires a large amount of manual labor and is in general an operation which would lend itself well to automatic handling, if a suitable machine could be built for carrying out the necessary steps.

Further, where separators, or dividers, containing fiber glass are used, the tips of the glass fibers often enter the hands of the workmen with highly objectionable results.

Accordingly, a principal object of the invention is to provide a machine for automatically assembling a plurality of positive grids, negative grids and separators into a unit capable of later association with similar units in a battery plate group.

A further object of the invention is to provide such a device which is relatively simple in its construction.

A further object of the invention is to provide a device, as aforesaid, which will be relatively simple to operate.

A further object of the invention is to provide a device, as aforesaid, which will have minimum maintenance requirements but which will have a high degree of accuracy.

A further object of the invention is to provide a device, as aforesaid, which will be adaptable to handling different sizes and shapes of battery plate grids.

A further object of the invention is to provide a device, as aforesaid, which will accommodate separators of a variety of different types and made from a variety of different materials.

Other objects and purposes of the invention will be apparent to persons acquainted with apparatus of this general type upon a reading of the following specification and with reference to the accompanying drawings:

In the drawings:

Figure 2 is a top view of the machine shown in Figure 1.

Figure 4 is a fragment of the machine appearing in Figure 1 taken on an enlarged scale.

Figure 5 is a section taken on the line V—V of Figure 2.

Figure 6 is a section taken on the line VI—VI of Figure 2.

Figure 7 is a fragmentary portion shown in Figure 6 taken from the right as appearing in Figure 6.

Figure 8 is a detail of a preferred form of transfer head.

Figure 9 is a section taken from line IX—IX of Figure 3.

Figure 11 is a view of the mechanical pick up device shown in Figure 8 as viewed from the right thereof.

Figure 12 is a modified mechanical pick up device.

Figure 13 is a view from the right of Figure 12.

Figure 14 shows a further modified pick up device.

*In general*

In general, my invention comprises at least four substantially parallel feeding conveyors positioned in side-by-side relationship with each other and an assembling conveyor extending across, and adjacent to the discharge ends of said four conveyors. Means are provided for transferring panels stacked on each of said feeding conveyors in selected sequence from each of said four feeding conveyors onto said assembling conveyor, the order of such transferring being such that as a given point on said assembling conveyor moves across the ends of said feeding conveyors a panel is placed from said feeding conveyors successively onto said point on said assembling conveyor and a stack comprising a unit for a battery plate group is thereby formed. Suitable means are provided for stopping the operation of selected conveyors when the articles thereon travel too close to the discharge ends thereof, said stopping means for each conveyor being preferably independent of at least some of the other conveyors. In practice, it has been found that it is necessary to apply said stopping means only to the conveyor carrying battery plate grids inasmuch as the separators carried on the other conveyors are sufficiently light in weight that the transfer means themselves prevent them from moving undesirably close to the discharge end of their respective conveyors. Suitable means are provided for moving the feeding conveyors and the assembling conveyor at proper rates of speed with respect to each other, the feeding conveyors being preferably moved intermittently.

Figure 1:
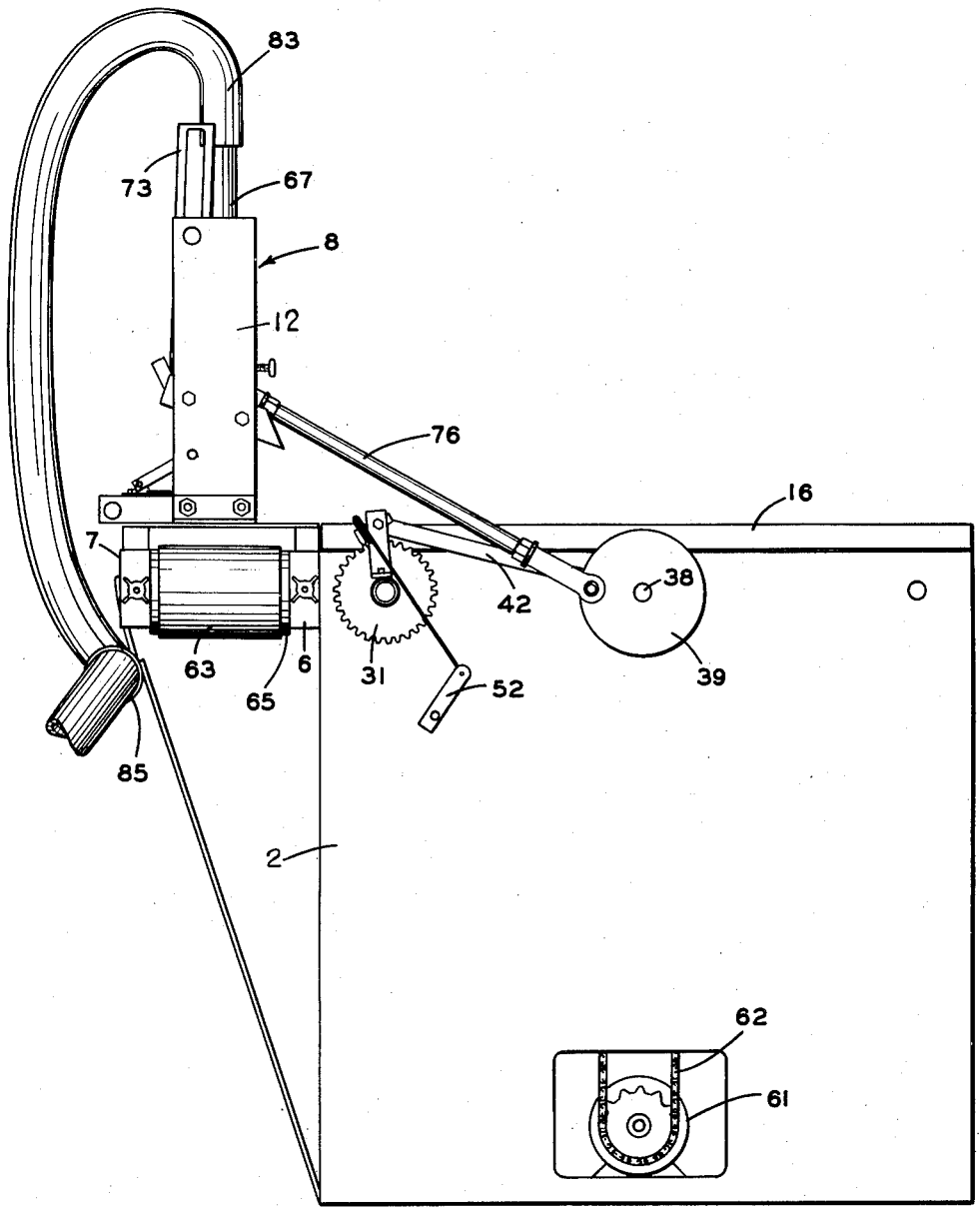
Figure 1 is a side view of the preferred embodiment of the invention.

The terms "above" and "below," and derivatives thereof, together with other words of similar import, refer to the position of the machine in normal use. The terms "forward" and "rearward" and derivatives thereof, refer to parts of the machine which appear at the right or left, respectively, of the machine as appearing in Figures 1 and 2.

*Detailed construction*

The frame of the device here comprises a pair of side members 1 and 2 and a top member 3 (Figure 3), which members are fastened together in any convenient manner, as by angle irons along the meeting corners thereof which are fastened to said side members by bolts, rivets or welding. Suitable cross members, of which one is indicated at 4, are provided for completing this portion of said frame.

Further frame structure is provided for the assembling conveyor and comprises a pair of transverse members 6 and 7 (Figures 1 and 2) which are supported on the frame structure above described by suitable brackets, not shown. Transfer mechanism support structure 8 comprises a pair of transfer mechanism bases 9 and 11 together with uprights 12 and 13, said bases and the uprights associated with each thereof being positioned near opposite sides of the above described base frame structure.

The top member 3 supports a pair of spaced and parallel guide strips 14 and 16 (Figure 2) to provide a first feeding channel, generally indicated at 17. Similar strips are provided to define second, third and fourth feeding channels 18, 19 and 21 respectively. Within each of said feeding channels is a pair of conveyor chains of which two are shown at 22 and 23. A shaft 26 (Figure 3) extends across the rightward end of the machine and supports the idler sprockets thereon upon which the rightward end of the several conveyor chains are in turn supported.

A shaft 27 (Figure 2) is supported at the leftward end of the machine for rotation with respect thereto and in this embodiment said shaft extends across the feeding channels 17 and 18. A further shaft 28 coaxial with said shaft 27, is rotatably mounted upon said frame and extends across the feeding channels 19 and 21. A driving gear 31 is mounted on the shaft 27, preferably outside of said frame, and a pair of driving sprockets 32 and 33 are mounted on said shaft within the feeding channel 17 for supporting and driving the chains 22 and 23.

A similar pair of sprockets 34 and 36 are mounted on the shaft 27 within the feeding channel 18 for similarly supporting and driving a conveyor chain within that channel. A similar drive gear 35 and similar drive sprockets are arranged on the shaft 28 in association with the feeding channels 19 and 21 in the same manner as the gear and sprockets just described are associated with the feeding channels 17 and 18.

A shaft 38 (Figures 1, and 3 and 5) is rotatably mounted on said frame base at a point spaced forwardly with respect to the shaft 27. The disk 39 is mounted thereon for reasons appearing hereinafter and an eccentric 41 is also mounted thereof adjacent said disk. Connected at one end to said eccentric is a rod 42 whose other end is connected to the upper end of a lever 43. The lower end of said lever is pivotally mounted by the sleeve 44 on the shaft 27 (Figure 4). A pawl 46 is pivotally affixed at 47 to the upper end of the lever 43 and is positioned for engagement with the teeth of the gear 31. A release rod 48 has a loop 49 at its upper end through which loop extends the release pin 51, said pin being mounted on the pawl 46. The lower end of said release rod 48 is connected to one end of the release lever 52 whose other end is mounted fixedly onto the pawl release shaft 53. A release trigger 54 extends through a suitable opening in the top sheet 3 of the frame at a point preferably intermediate the feeding chains 23 and 22 and at the limit beyond which it is desired that the component parts of the battery plate units assembled by the machine shall not travel. Said trigger extends downwardly past the shaft 27 (Figure 6), and is connected non-rotatably with the pawl release shaft 53. Preferably said shaft 53 extends only to the bearing 55, which is supported by any convenient means not shown on the frame of the machine, and the coaxially positioned shaft 60 extends the rest of the way across the machine.

Similar structure is provided on the opposite side of the machine for driving the gear 35 and corresponding release structure is associated with a trigger 59 and the shaft 60 for releasing said last-named pawl.

A motor 61 (Figures 1 and 3) provides motive power for the mechanism above described and is connected in any convenient manner as by means including the chain 62 to the shaft 38 for driving the said parts above described.

A pair of assembling conveyor rollers, of which one is shown at 65 (Figures 1, 2, 3 and others) is rotatably supported upon suitable bearings between the frame elements 6 and 7 and hold the assembling conveyor 63 positioned relatively close to the discharge ends of the horizontal feeding conveyors provided by the structure associated with the several feeding paths 17, 18, 19 and 21. Further chain and sprocket structure including the chain 64 is provided for driving said assembling conveyor from said motor in precisely timed relationship with the movement of the several feeding conveyors.

A transfer device supporting rod 66 (Figures 2, 3, 6 and others) is supported at its respective ends in the uprights 12 and 13 and for the guidance of the several transfer devices 67, 68, 69 and 71. A rod 72 supports at each of its respective ends guiding brackets 73 and 74, which brackets are non-rotatably affixed near their lower ends to the rod 72 and are slotted at their upper ends for slidably and rotatably embracing the rod 66. A pair of cam tracks, of which one is shown at 75, are mounted on the facing sides of the uprights 12 and 13 in position to support and guide the lower ends of the brackets 73 and 74. A pair of reciprocable rods 76 and 77 are connected at their respective rearward ends to the lower ends of said brackets and at their respective forward ends are connected to the disk 39 and to the counterpart 40 of said disk 39 on the other side of the machine. Thus, rotation of said disks will effect a reciprocation of said rods and an arcuate movement on the rollers 70 (Figure 7) along the cams by the lower ends of the respective brackets 73 and 74.

The transfer devices 67, 68, 69 and 71 (Figures 2 and 3) are each fixed by clamp mechanisms of which one is indicated at 78 to the rod 72 and are positioned in alignment with the centers of each of the feeding channels 17, 18, 19 and 21 respectively.

The two transfer devices 67 and 69 are here fitted with pneumatic engaging means, here the suction cups 81 and 82, respectively, at their lower ends and are supplied through suitable hoses 83 and 84 from a suction manifold 85 which is in turn connected to any suitable source of suction. The lower ends of the transfer devices 68 and 71 are in this embodiment provided with mechanical engaging means, here the finger-type lift devices 86 and 87. Each of these devices (Figures 8 and 11) comprises a substantially rigid cross member 88 and resilient fingers 89 and 91, said fingers extending downwardly and divergingly from the cross member. At least the facing surfaces of the ends of the resilient fingers are constructed for engaging the edges of the separators. Here said surfaces are provided with an elastomeric substance, as rubber, of sufficient softness and thickness to be substantially indented by the edges of the separators as hereinafter described in more detail. Normally, a thickness of $\frac{1}{16}$ of an inch and a softness of ordinary uncured rubber is satisfactory.

A knock off rod 93 (Figure 2) is rotatably supported on the transfer mechanism support structure by suitable structure including a pair of blocks of which one is shown at 94. A plurality of knock off members 96, 97, 98 and 99 are rigidly and adjustably arranged on the rod 93 in such position that the arms of the U-shaped knock off members 96 and 98 will extend on either side of the suction cups 81 and 82, respectively, and the knock off members 97 and 99 are of such width as to extend between the fingers of their respectively associated transfer devices. The shaft 93 (Figure 5) is connected through a linkage 101 to the lever 102, which last-named lever is positioned in the path of the lower end of the brackets 73 and 74. Thus, when the said brackets rotate around the rods 66 in a counter-clockwise direction the respective lower ends contact the upper ends of the levers 102 to rotate them around their pivot points 103 in a clockwise direction and thereby act through the linkage 101 to rotate the shaft 93 in a counter-clockwise direction.

The fingers 106 (Figure 6) are positioned between the conveyor chains 22 and 23 for engaging the lower edge of the stack "A" of negative grids if they should push too far past the trigger. Said fingers are connected by the rod 107 to the eccentric 108, said eccentric being mounted on the shaft 38. Other similar fingers 109 (Figure 2) may be provided in the channel 19 also.

Operation

While the operation of the machine, like its construction, is subject to a number of variations, a typical sequence will be described for illustrative purposes but it will be understood that such sequence is illustrative only.

In such typical sequence, the set of suitably pasted battery plate grids, usually negative grids, are stacked as shown in Figure 6 in the feeding channel 17 and resting upon the chains 22 and 23. Suitable separators are similarly stacked in the feeding channel 18 and are so arranged therein that the side of the separator nearest the assembling conveyor is the side which, in the finished stack, is to be away from the battery plate grids arranged in the feeding channel 17. A further set of battery plate grids, usually the positive grids, is arranged within the feeding channel 19 and a final set of separators are arranged within the feeding channel 21.

With the machine operating, the shaft 38 will be rotating continuously. This effects reciprocable movement of the connecting rods 42 and 45 and thereby effects actuation of the pawl 46, and its counterpart 70 on the other side of the machine, to cause simultaneous intermittent movement of the gear 31 and its counterpart 35 on the other side of the machine and thereby effects intermittent movement of each of the several feeding conveyors.

At the same time vacuum may be applied to the manifold 85, when used, in any convenient manner.

Figure 10:
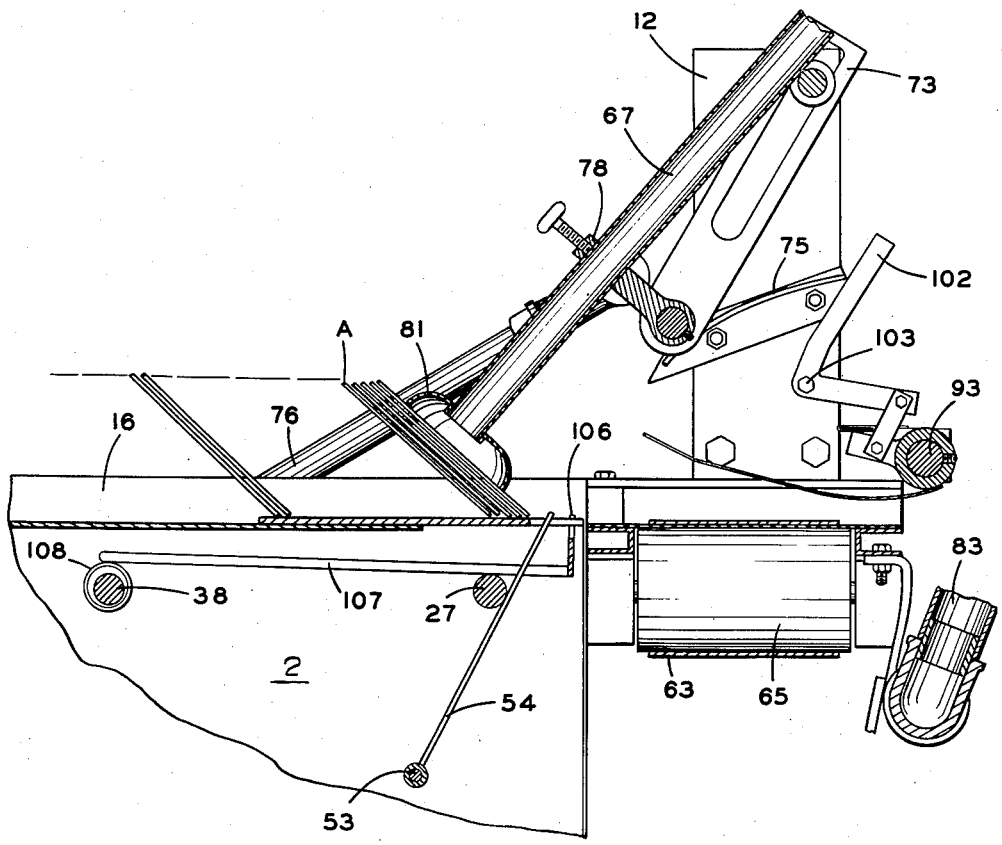
Figure 10 is a fragmentary section taken on the line X—X of Figure 3 and showing the transferring device in a different operating position.

Rotation of the shaft 38 also effects reciprocation of the rods 76 and 77 and this effects a combined oscillating and reciprocating movement of the lower ends of the brackets 73 and 74 along the cam 75 and its counterpart on the other side of the machine. Thus, in the position of the transfer mechanism shown in Figure 10, with each of the several transfer devices 67, 68, 69 and 71 placed against the component part arranged in the feeding channels 17, 18, 19 and 21, respectively, the lower ends of said feeding devices approach the surfaces of said component parts substantially perpendicularly thereto. The two suction elements 81 and 82 thus each engage and pick up a negative and a positive battery plate grid, respectively, and the fingers associated with the transfer devices 68 and 71 engage the edges of the separators (Figure 8) in the feeding channels 18 and 21 respectively.

The diverging nature of said fingers prevents said fingers from engaging more than the top one of the said separators and the softness of the elastomeric material with which the facing side of the fingers are coated permits even relatively fragile separators to press against the resiliency of said fingers sufficiently to enable them to be lifted from the stack upon withdrawal of the transfer devices.

Reverse movement of said transfer devices returns the apparatus into the position shown in Figure 6 in which each of said transfer devices is then positioned over the center of the assembly conveyor. Movement of the lever 102 occurring at this moment, as described above, rotates the shaft 93 and this moves each of the knock off devices downwardly to separate the several battery plate group components from their respectively associated feeding devices and cause them to drop into position on the assembly conveyor.

Figure 3:
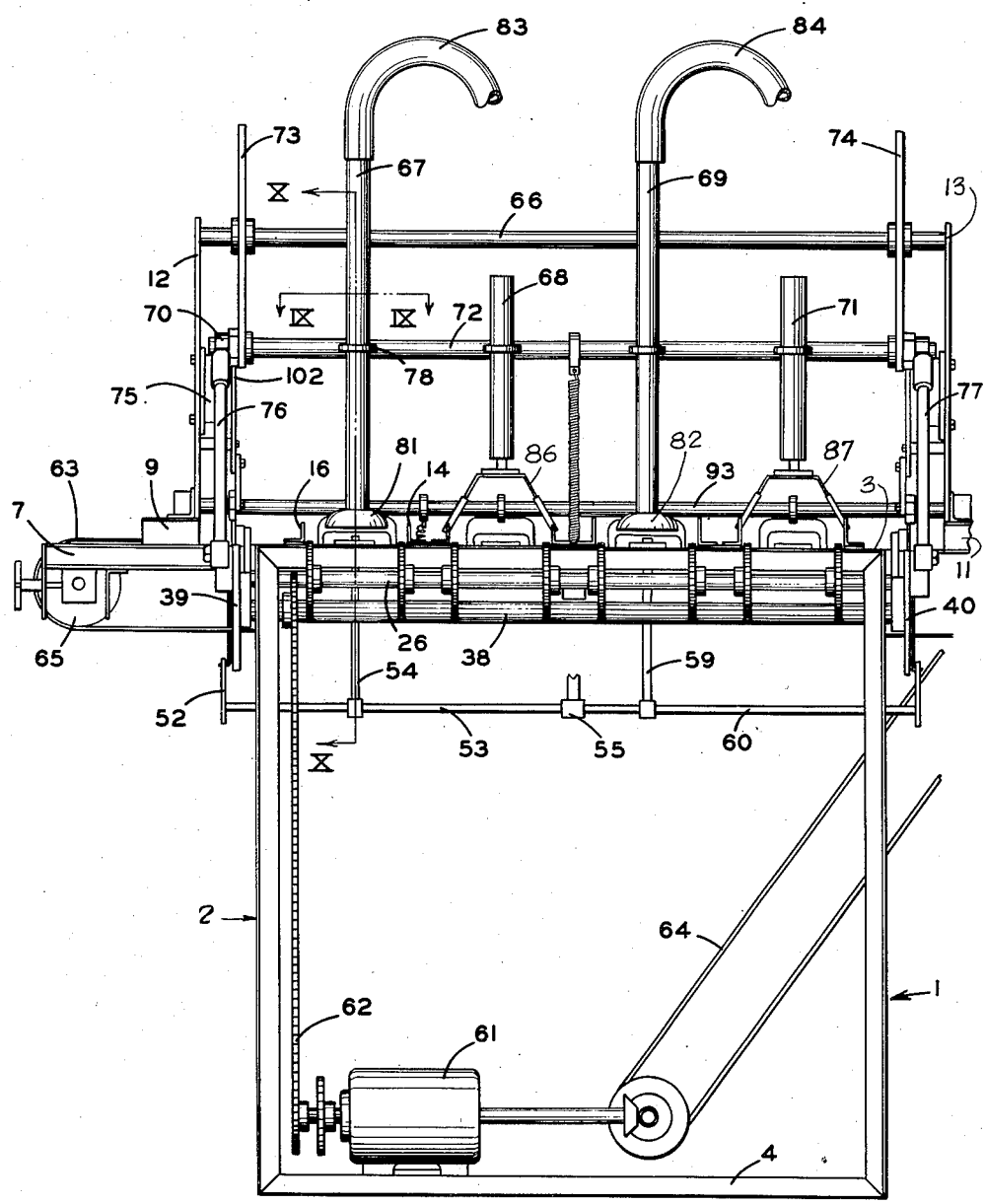
Figure 3 is an end view of the machine taken from the rightward end of the machine as appearing in Figures 1 and 2.

It will be apparent in view of the foregoing that with the mechanism properly timed, and the assembling conveyor moving from left to right as appearing in Figure 3, a negative grid will be placed in a selected position on said assembling conveyor and it will then be moved to a point in line with feeding channel 18 and will there have a separator superimposed thereon, next it will move in line with the feeding channel 19 where it will have a positive grid added to the stack and lastly it will move into line with the feeding channel 21 where a further separator will be added to the stack.

Inasmuch as the fingers of the transfer devices 68 and 71 act mechanically against the edges of the separators, the device herein described will operate successfully even where the separators are somewhat too porous for suction cups. The pressure on the edges thereof is sufficiently light that the machine will be successful with even the most fragile separators now in commercial use.

Inasmuch as it is impossible as a practical matter to time the movement of the feeding conveyors precisely with the movement of the rest of the machine, it will be appreciated that in normal operation the feeding conveyors will either commence to overrun the transfer mechanism or they will be a little short and the transfer mechanism will start to miss transferring component parts. This problem has been overcome in this apparatus by the provision of the triggers and their associated mechanism. With this structure the conveyors are caused to operate a little on the fast side of absolutely correct correlation with the assembling conveyor. Thus, as the negative grids begin to feed past the zone selected for proper pick up thereof by the transfer device 67 they will strike the trigger, cause clockwise rotation of the shaft 53 (Figure 6) or counter-wise rotation thereof as same appears in Figure 4 and thus lift the pawl 46 out of engagement with the teeth of the gear 31 (Figure 5). This stops the movement of the conveyor until enough of said grids have been taken from the stack by the transfer device 67 to release said trigger and permit the rod 48 to resume the position shown in Figure 4. This permits the pawl 46 again to engage the teeth of the gear 31 so that the reciprocable movement of the rod 42, which is continuous, will again start movement of the conveyor chains 14 and 16.

It is not necessary in all cases to provide such trigger mechanism in line with the separators being fed in the feeding channel 18, as the said separators are sufficiently light that the rightward force applied thereto by the motion of the transfer mechanism 68 will push the separators rightwardly on and along the conveyor chains associated with the feeding channels so that there is no danger of these overrunning the proper feeding position.

The similar drive structure and drive stopping structure associated with the feeding channels 19 and 21 operates in the same manner and for the same purpose.

The hook members 106 and 109, where used, function to pull both separators and grid plates back into place and prevent their overrunning the trigger mechanism and restore their proper feeding position in such cases where the mere stopping of the conveyors may not provide sufficient control. These are more likely to be used with the battery plate grids in view of their greater weight, but may be used also with the separators if desired.

Modifications

While the fingers associated with the mechanical engaging means, as appearing in Figures 8 and 11 at 89 and 91, are here shown as coated with an elastomeric substance, it will be appreciated in the view of the foregoing that a variety of other specific panel engaging means, as saw-teeth may be utilized without departing from the principal objects of the invention.

Likewise, as illustrated in Figures 12 and 13, a variety of other mechanically operating finger controlling mechanisms may be provided in place of the form illustrated in Figures 8 and 11.

Referring to Figures 12 and 13, a platform 111 is shown supported by one of the transfer device supporting means, such as the one appearing at 69, and this supports the divergent engaging fingers 112 and 113, together with their counterparts on the other side as the platform 111, such as the further fingers shown at 114.

A coil spring 116 is provided for urging the lower ends of the fingers together and the limit of such urging is established by a rod or wire 117. Saw-teeth 118 are provided on the mutually opposed edges of the several panel engaging fingers and adjacent the lower ends thereof. It will be appreciated that the wide divergence of the engaging fingers from each other, when taken in connection with the fact that the panels themselves, as indicated at "B" in Figure 12, are positioned so that the fingers approach the panels at substantially right angles with respect to the surface of the panels insures that only the top panel is engaged and lifted from the stack.

These, and similar, types of engaging devices may be used with either the separators or the grid plates with or without the association of the pneumatic gripping devices in whatever arrangements best suits a particular application and best meets the requirements of a particular set of grid plates and a particular type of separators.

A particular advantage of the wholly mechanical type of engaging device is that it eliminates the auxiliary equipment required for pneumatic devices and, further, it provides a positive engagement regardless of whether the component in question is a grid plate or a separator, and whether or not the separator or the grid in question is porous.

It will be obvious in view of the foregoing that many variations may be made in the exact arrangement and shape of the engaging fingers and the means applied to them for engagement with various types of specific grid or separators providing only that fingers are divergent from each other at a sufficiently wide angle, as between about 60 and 90 degrees with respect to each other, so that the opposed surfaces of such fingers will engage only the upper grid or separator, as the case may be.

In this case it may be preferable for the knock-off mechanism, generally indicated at 98 in Figure 12, to act upwardly, by suitable modification of the linkage driving the shaft 93, to move upwardly against the fingers 112 and 113 to spread them apart, instead of downwardly against the component being handled as described above.

A further modification of the mechanical gripping means is indicated in Figure 14 wherein the platform 121 supports a pair of toggle members 122 and 123 pivotally supported at 124 and 126. The legs 127 and 128 are connected by the pivot 129 and the slots 131 and 132 permit sufficient lateral motion of the angular members 122 and 123 to permit the pivot point 129 to move vertically. A spring 133 holds the pin 129 in either the upwardly or downwardly position and the pins 134, 136, 137 and 138 limit such upward and downward movement.

An actuator 139 engages the stack of component parts, either battery plate grids or separators, when the mechanical gripping device is lowered by the rod 69 downwardly against a suitable stack thereof and thereby moves the gripping arms 140 and 141 together to engage a top panel of a stack of such component parts in the same manner as described above. When the device is in position for unloading, a knock-off member actuated in a manner generally similar to the knock-off members above described such as the knock-off member 98, moves downwardly against the unloading actuator 142 to push the toggle downwardly and to thereby move the fingers 140 and 141 apart.

It will be appreciated that larger numbers of feeding channels, and thereby larger stacks of assembled battery plate groups may be provided if desired without departing from the purposes of the invention, inasmuch as the adding of such further units will be merely the addition of multiples of the apparatus shown and described herein. Further, it will be recognized that various types of receiving devices may be provided at the discharge end of the assembling conveyor without departing from the scope of the invention. Further, while particular engaging heads have been provided in connection with the transfer devices in the actual embodiment here described, and such engaging heads are preferable for carrying out the purposes of the present invention, it will be recognized that certain of said purposes might be in some cases carried out by other types of engaging heads, particularly by providing suction heads for all of said transfer devices, or by using the transfer devices shown in Figure 8 for the grid plates where the paste is too porous to permit effective action of the suction cups, such modifications being fully within the scope of the present invention.

These and other modifications, will, in the light of the foregoing, all be obvious to persons acquainted with apparatus of this general type and hence such variations are all within the terms of the hereinafter appended claims excepting as said claims may by their own terms expressly require otherwise.

I claim:

1. In an assembling machine for storage battery parts, the combination: a plurality of parallel, horizontal feeding conveyors; a horizontal assembling conveyor arranged perpendicularly across the discharge ends of said feeding conveyors and coplanar therewith; limit means associated with one feeding conveyor for stopping said one feeding conveyor without affecting the speed of other feeding conveyors when the articles carried on said one feeding conveyor pass a selected point thereon; transfer means associated with each of the feeding conveyors which carry grid panels for transferring said grid panels from said selected point one at a time onto said assembling conveyor and other transfer means for transferring separators one at a time onto said assembling conveyor; knock-off means associated with the transfer means to knock off the articles carried by the transfer means and deposit them on the assembling conveyor.

2. A machine, as in claim 1, wherein said other transfer means includes resilient fingers extending divergingly with respect to each other, for transferring said separators one at a time onto said assembling conveyor.

3. A machine, as in claim 1, wherein said first mentioned transfer means includes suction devices for transferring said grid panels one at a time onto said assembling conveyor.

4. In an assembling machine for storage battery parts, the combination: a plurality of parallel feeding conveyors; an assembling conveyor arranged perpendicularly across the discharge ends of said feeding conveyors and coplanar therewith; a trigger mounted on a feeding conveyor adjacent the top surface thereof and projecting into the path of articles carried on said feeding conveyor, and means actuated by movement of said trigger for stopping said feeding conveyor, without affecting the speed of the other feeding conveyors, when the articles carried on said feeding conveyor pass a selected point; independent means associated with each feeding conveyor for transferring articles thereon from said selected point, one at a time, onto said assembling conveyor, whereby articles from said feeding conveyors are arranged in selective sequence in a single stack on said assembling conveyor as said stack is carried past the ends of said feeding conveyors; and hook means located between the assembling conveyor and the trigger to prevent the articles on the feeding conveyor from overrunning the trigger mechanism.

References Cited in the file of this patent

UNITED STATES PATENTS

| | | |
|---|---|---|
| 420,194 | Gauchot | Jan. 28, 1890 |
| 1,223,398 | Kirkpatrick | Apr. 24, 1917 |
| 2,138,306 | Patrick | Nov. 29, 1938 |
| 2,479,060 | Davidson | Aug. 16, 1949 |
| 2,532,626 | Kleineberg | Dec. 5, 1950 |
| 2,558,685 | Honig | June 26, 1951 |
| 2,562,247 | Schie | July 31, 1951 |
| 2,568,248 | Nichols et al. | Sept. 18, 1951 |
| 2,626,038 | Smith | Jan. 20, 1953 |